Feb. 4, 1958     A. T. MITCHELL, SR     2,822,081
PLUMBERS CARRYING CASE
Filed Oct. 10, 1955     2 Sheets-Sheet 1
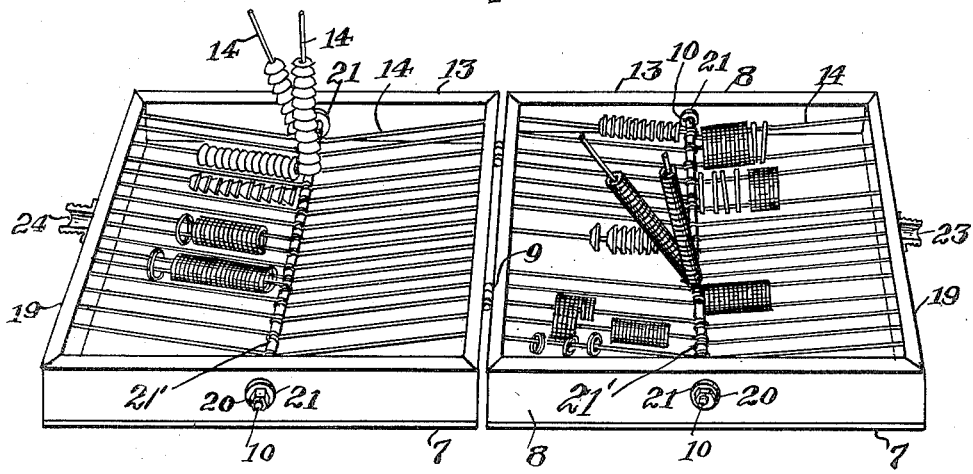
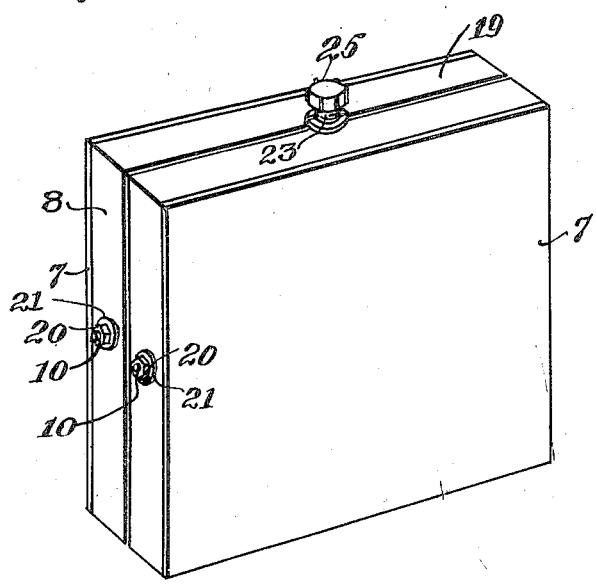
INVENTOR.
Allen T. Mitchell, Sr.
BY
Attorney

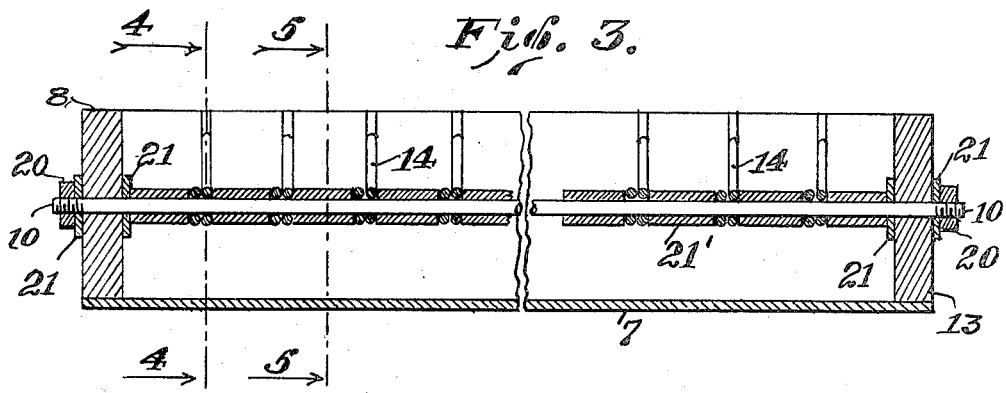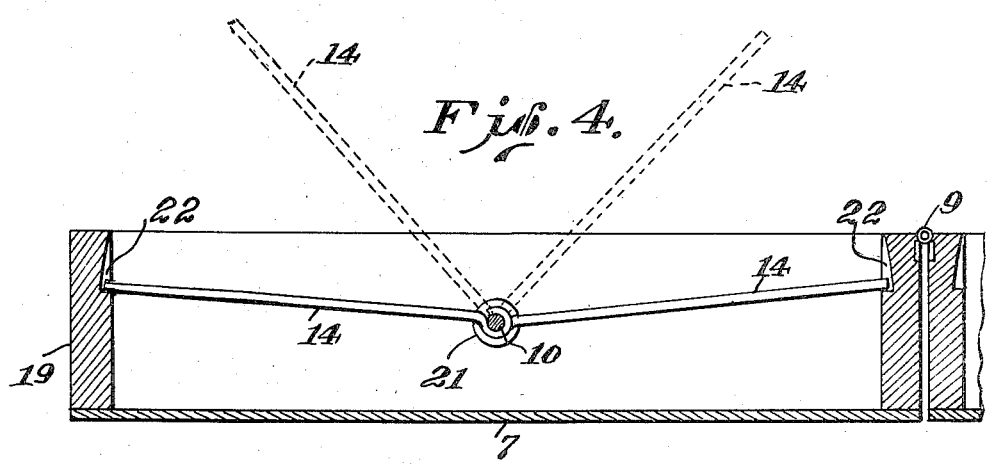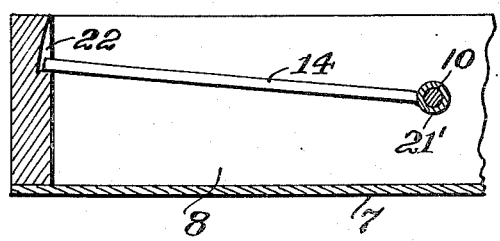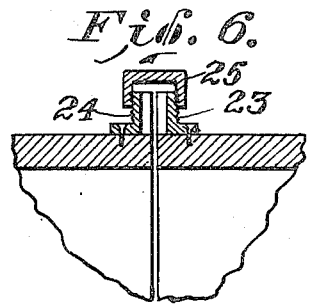

2,822,081
PLUMBERS CARRYING CASE
Allen T. Mitchell, Sr., Upland, Calif.
Application October 10, 1955, Serial No. 539,416
2 Claims. (Cl. 206—16)

My invention relates to a plumber's carrying case for use as a display device or as a repair kit, by the use of which a wide variety of small articles can be kept in order for convenient selection and use. While I have contemplated the device as primarily intended for use by plumbers for carrying minor articles for use in making minor repairs, e. g., as faucet washers, replaceable seats, cone washers of assorted sizes and the like, it is well adapted for carrying other minor repair articles and keeping them in place without mixing them or spilling them, and it is not necessarily limited to the holding of repair articles used by plumbers although that is its main field of utility as now contemplated.

Another object of the invention is to hold repair articles of various kinds, as washers, nuts and the like in assorted relation, so as to render easy the selection of parts for use as desired.

Another object is to keep repair parts and the like in segregated relation by simple and effective means, yet so as to be able to release one or more items quickly when needed. My device is particularly effective in holding washers and like articles having a central hole in place for quick release when needed, these articles being held in assorted relation for ready selection according to size, color, etc.

Another object is to support a number of similar articles close together and so as to be easily removed in desired number or quantity. Thus, by using rods supported to swing in a half-circle any desired number of washers, etc., may be removed, and the supporting rod returned to the position where the remaining articles thereon stay put without danger of mixing with others, or coming off their rod.

Stock-taking is another situation in which my device is useful, since it will hold assorted articles in place as desired so that they can be counted or separated, etc. as desired. The case may be moved about without any confusion of contents, and even upset without causing trouble. At a glance a workman can determine whether or not he has a full supply of repair parts, etc. for a job, and many other advantages will appear upon reading the and many other advantages will appear uopn reading the specification with the subjoined drawings which are made a part of this application and in which similar reference characters indicate similar parts.

In the drawings:

Fig. 1 is a perspective view of the device of my invention, various parts being shown in different positions that conduce effective utilization of the device;

Fig. 2 is a perspective of my device in closed position;

Fig. 3, a longitudinal section through the axis about which the various parts are swingable;

Fig. 4, a section on line 4—4 of Fig. 3;

Fig. 5, a section on line 5—5 of Fig. 3; and

Fig. 6, a detail of means for holding the case in closed position.

In the drawings, reference characters 7 and 8 indicate side members of a case comprising two parts connected along one side by hinges 9, 9. Each of the parts that coact to form the display case comprises a box or tray that is open at the top when the case is laid open as in Fig. 1, and each tray member has a rod 10 extending from end to end of a tray and through the ends of the same. Each rod 10, as best shown in Fig. 3, has its ends passing through the opposite end members 13, 13, with the rods 14, 14 bent around a rod 10 to provide a pivotal support about which the rods 14, 14 are pivoted to swing in a half-circle from a position where a rod 14 lies as at the left as in Fig. 1 to a position where it extends toward the right of its pivot rod 10 on which the rod is pivotally supported. The extreme outer ends of the rods 14 rest in notches 18 in side members 19 of the case, and the thickness of the contacting rods at their inner ends is such that they can swing freely about pivot 14 but may be clamped in position by means of nuts 20 that are threaded on threaded parts of rod 10, said nuts bearing against washers 21 on said rod 10 at opposite sides of tray members and providing means whereby the sides 13, 13 can be sprung or slid toward each other into clamping relation to the other parts of the casing, the side members 13, 14, the washers 21, the spacers 21' and the portions of rods 14, 14 encircling rod 10 all being clamped together by such operation, so as to prevent relative pivotal movement thereof.

For holding the case in closed position, I provide a fitting consisting of a sort of split bolt that is made of two sections of a fitting split axially to form two parts 23 and 24 fixed to the upper part of the casing and having registering threads coacting with an internal thread on a cap 25 that screws on the split bolt and locks the casing in closed position.

It will be obvious to those skilled in the art that my device may be varied in numerous details, all without departing from the spirit of the invention and, therefore, I do not limit myself to what is shown in the drawings and described in the specification, but only as indicated in the appended claims.

Having thus fully described my said invention, I claim:

1. A plumber's kit comprising a pair of trays having adjacent sides pivoted together along a common axis, a pivot rod extending lengthwise mid-way of each tray, article supporting rods each having one end pivoted on one of said pivot rods and adapted to hold articles thereon, means for maintaining the article supporting rods in spaced relation, said tray having slots for the receipt of the free ends of said article supporting rods, fastening means on said pivot rod adapted to fasten the article supporting rods together and to hold them in adjusted position, and a split threaded projection and an encircling nut therefor for holding said trays in closed position said projection having a portion secured on each of said trays.

2. A plumber's kit comprising a pair of trays having adjacent sides pivoted together along a common axis, a pivot rod extending lengthwise mid-way of each tray, article supporting rods each having one end pivoted on one of said pivot rods and adapted to hold articles or the like supported thereon, spacing means for maintaining the article supporting rods in spaced relation, said tray having slots for the receipt of the free ends of said article supporting rods, and fastening means on said pivot rod adapted to fasten the article supporting rods together and to hold them in adjusted position.

References Cited in the file of this patent

UNITED STATES PATENTS

| | | |
|---|---|---|
| 473,080 | Pierre | Apr. 19, 1892 |
| 486,640 | Gingras | Nov. 22, 1892 |
| 683,998 | Seidl | Oct. 8, 1901 |
| 781,313 | Thomas | Jan. 31, 1905 |
| 1,012,605 | Davenport | Dec. 26, 1911 |
| 1,036,237 | Hirsohn | Aug. 20, 1912 |
| 1,749,630 | Donaldson | Mar. 4, 1930 |
| 1,795,291 | Dunn | Mar. 10, 1931 |
| 1,927,110 | Bannister et al. | Sept. 19, 1933 |
| 2,111,954 | Urbany | Mar. 22, 1938 |